E. W. GOODRICK.
FEEDING DEVICE FOR GRASS TWINE MACHINES.
APPLICATION FILED JUNE 2, 1910.
1,048,687.
Patented Dec. 31, 1912.
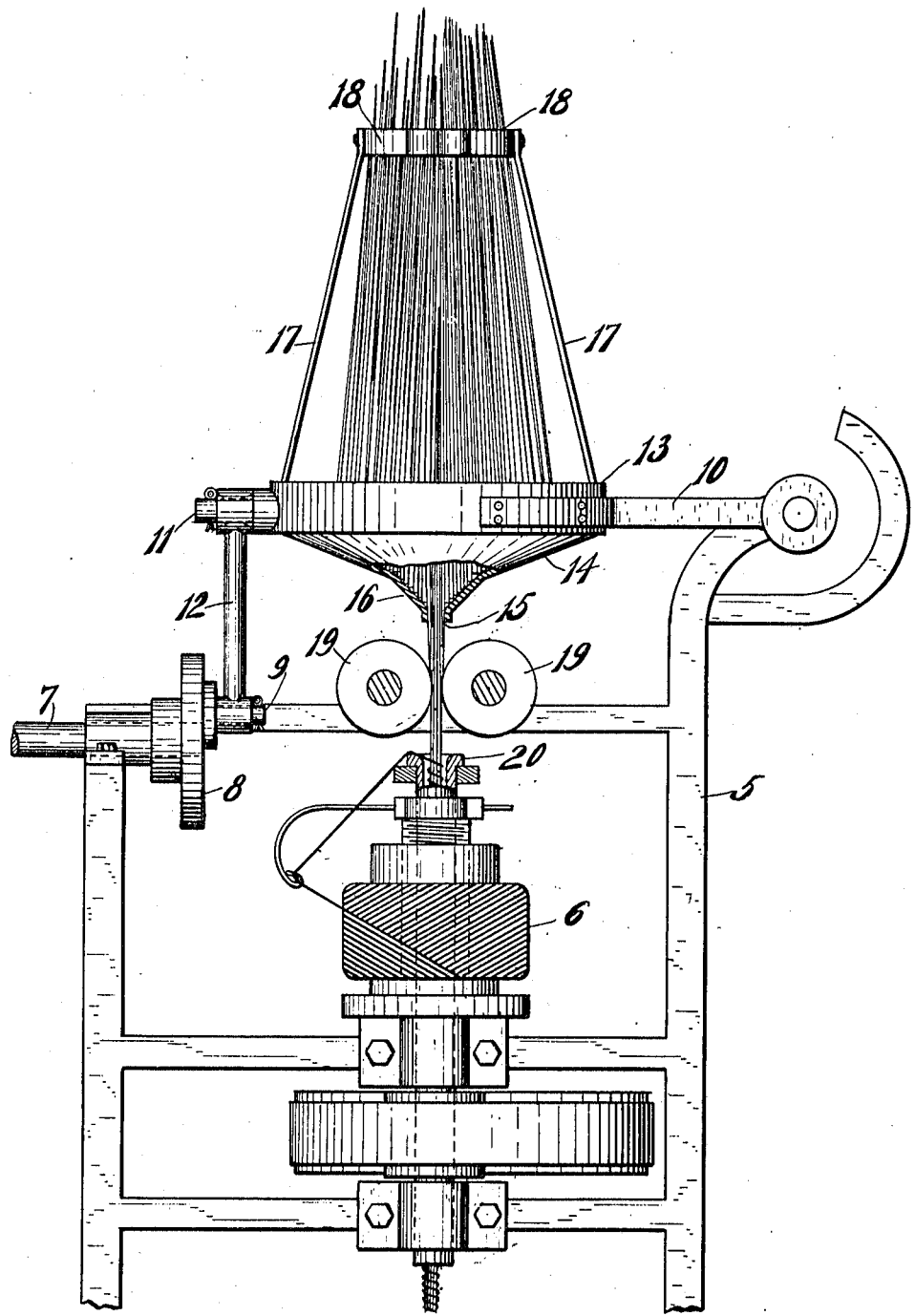

UNITED STATES PATENT OFFICE.

EDWARD W. GOODRICK, OF OSHKOSH, WISCONSIN, ASSIGNOR TO WISCONSIN GRASS RUG AND CARPET COMPANY, OF FOND DU LAC, WISCONSIN, A CORPORATION OF WISCONSIN.

FEEDING DEVICE FOR GRASS-TWINE MACHINES.

1,048,687. Specification of Letters Patent. Patented Dec. 31, 1912.

Application filed June 2, 1910. Serial No. 564,659.

*To all whom it may concern:*

Be it known that I, EDWARD W. GOODRICK, residing in Oshkosh, in the county of Winnebago and State of Wisconsin, have invented new and useful Improvements in Feeding Devices for Grass-Twine Machines, of which the following is a description, reference being had to the accompanying drawings, which are a part of this specification.

This invention relates to improvements in feeding devices particularly adapted for feeding grass twine in a continuous stream to the thread or cord wrapping mechanism of a grass twine machine.

It is one of the objects of this invention to provide a feeding device for grass twine machines which is adapted to feed grass or other material of varying lengths and thicknesses in a continuous stream of substantially the same diameter.

A further object of this invention is to provide a feeding device for grass twine machines in which the grass or other like material is discharged substantially vertically from the device.

A further object of this invention is to provide a feeding device for grass twine machines which is adapted to be oscillated by means of a wrist pin or cranked connection with a rotary member.

With the above and other objects in view, the invention consists of the feeding device and its parts and combinations as set forth in the claims, and all equivalent thereof.

In the accompanying drawing, in which the same reference characters indicate the same parts in the view: the figure of the drawing is a side view of a fragment of a grass twine machine provided with the improved feeding device, portions of both the feeding device and the grass twine machine being in section.

Referring to the drawing the numeral 5 indicates the frame of the grass twine machine and 6 the thread or cord wrapping mechanism mounted thereon which may be of any ordinary construction. A vibrator shaft 7 provided with a disk 8 having a wrist pin 9 extending therefrom is journaled on the main frame and is adapted to oscillate or vibrate a combined grass holder and feeder 10 pivotally mounted on the frame 5. The free end of this holder is provided with a projecting pin 11 which is pivotally connected to the wrist pin of the vibrating shaft 7 by means of a connecting link 12. The openings of the connecting link through which the pins extend are of sufficient size to permit the oscillation of the holder without binding. The holder 10 consists of a circular receptacle 13 having a conical bottom portion 14 provided with a feed or discharge aperture 15 at its vortex of sufficient size to permit several lengths of grass or other material to pass through it at the same time. The angle of the bottom portion adjacent to the discharge aperture is increased as indicated by the numeral 16 in order to expedite the movement of the grass or other material toward the discharge aperture. The aperture 15 is provided at the lowest point of the bottom portion so that when the holder is vibrated by the vibrator shaft 7 the lengths of grass in the holder will work down toward the aperture and pass therethrough in a continuous stream. The side portions of the holder are provided with upstanding spring rods 17 carrying guards 18 on their upper ends which serve to hold the lengths of grass in vertical position and yield sufficiently sidewise to permit the grass to be forced between the guards in charging the holder.

A pair of draw feed rollers 19 rotatably journaled on the frame 5 and positioned immediately beneath the aperture of the receptacle and between the receptacle and the thread or cord wrapping mechanism, are adapted to draw the grass or other material away from the receptacle and feed it to the wrapping mechanism positioned beneath the rollers. The feed rollers may be rotated in any manner desired.

While the tubular shaft is shown positioned in vertical axial alinement with the aperture of the receptacle the receptacle is adapted to feed material to wrapping mechanisms in which the tubular shaft is in a horizontal position by having the material pass partly around one of the feed rollers before entering the tubular shaft.

In the operation of the feeding device marsh or other grass is placed on the holder with the butt ends resting on the conical bottom portion of the receptacle or holder. The rotation of the vibrator shaft causes the rapid vibration or oscillation of the grass holder and the grass contained therein to work down the incline of the conical bottom portion and pass out through the aperture in a continuous stream of overlapping lengths of grass which pass between the draw feed rollers. The draw feed rollers will exert a pull on the stream of material and compress and feed it to the wrapping mechanism which will wrap thread or cord therearound and form a continuous twine of grass. As the aperture of the holder is of sufficient size to permit the passage therethrough of several lengths of grass at the same time and as the lengths of grass taper to a less diameter toward their tops the lengths of grass will be discharged in successive order and overlap each other and break joints. As the butt ends of the grass cannot pass through except in successive order due to the gradual taper of each length of grass a regular even feed of material to the wrapping mechanism is provided for.

While the feed device shown and described is adapted to form a twine of a given size it is obvious that holders with different sized aperture may be provided to form twine of various sizes.

From the foregoing description it will be seen that a grass twine feeding device is provided which is very simple in construction and operation and is well adapted to feed a continuous stream of material of various lengths and diameters to the wrapping mechanism.

What I claim as my invention is:

1. A feeding device for grass twine machines, comprising a material holder consisting of a receptacle having a conical bottom portion provided with an aperture at its vortex through which the material is discharged, said holder adapted to hold material extending in a vertical direction with the lower ends of the material resting on the inclined bottom portion, draw rollers positioned immediately beneath the conical bottom portion, and means for vibrating the receptacle.

2. A feeding device for grass twine machines, comprising a material holder consisting of a receptacle having a conical bottom portion provided with an aperture at its vortex through which the material is discharged, the taper of said bottom portion increasing toward the aperture, and means for vibrating said receptacle.

3. A feeding device for grass twine machines, comprising a material holder consisting of a receptacle having a conical bottom portion provided with an aperture at its vortex through which the material is discharged, the taper of said bottom portion increasing toward the aperture, means for drawing material through the aperture, and means for vibrating said receptacle.

4. A feeding device for grass twine machines, comprising a material holder consisting of a receptacle having a conical bottom portion provided with an aperture at its vortex through which the material is discharged, the taper of said bottom portion increasing toward the aperture, draw rollers for drawing material through the aperture, and crank means for vibrating the receptacle.

5. A feeding device for grass twine machines, comprising a material holder consisting of a receptacle having a conical bottom portion provided with an aperture at its vortex through which the material is discharged, a crank shaft, and a link connection between the crank portion of the shaft and the holder.

6. A feeding device for grass twine machines, comprising a material holder consisting of a receptacle having a conical bottom portion provided with an aperture at its vortex through which the material is discharged, a crank shaft, a link connection between the crank portion of the shaft and the holder, and draw rollers positioned beneath the receptacles.

7. A feeding device for grass twine machines, comprising a pivoted material holder provided with a conical bottom portion having an aperture at its vortex through which the material is discharged, the taper of said bottom portion increasing toward the aperture, a crank shaft, a link connecting the crank portion of the shaft to the holder, and draw rollers positioned beneath the conical bottom portion.

8. A feeding device for grass twine machines, comprising a frame, a pivoted material holder provided with a conical bottom portion having an aperture at its vortex through which the material is discharged, a shaft journaled on the frame and provided with a disk having a wrist pin extending therefrom, a link connection between the wrist pin and the material holder, and draw rollers positioned beneath the conical bottom portion.

In testimony whereof, I affix my signature, in presence of two witnesses.

EDWARD W. GOODRICK.

Witnesses:
F. A. KAERWER,
C. POTACK.